(12) United States Patent
Horng

(10) Patent No.: US 8,598,764 B2
(45) Date of Patent: Dec. 3, 2013

(54) INSULATION BOBBIN OF A STATOR

(71) Applicant: Sunonwealth Electric Machine Industry Co., Ltd., Kaohsiung (TW)

(72) Inventor: Alex Horng, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 13/749,807

(22) Filed: Jan. 25, 2013

(65) Prior Publication Data
US 2013/0134821 A1 May 30, 2013

Related U.S. Application Data

(62) Division of application No. 12/944,055, filed on Nov. 11, 2010, now abandoned.

(30) Foreign Application Priority Data

Sep. 28, 2010 (TW) .............................. 99132797 A

(51) Int. Cl.
H02K 3/34 (2006.01)
(52) U.S. Cl.
USPC .......................................................... 310/194
(58) Field of Classification Search
USPC .......................................................... 310/194
See application file for complete search history.

(56) References Cited

U.S. PATENT DOCUMENTS

| 3,339,097 | A  | * | 8/1967  | Dunn ............................. 310/194 |
| 4,818,911 | A  | * | 4/1989  | Taguchi et al. ........ 310/216.105 |
| 6,670,736 | B2 | * | 12/2003 | Horng et al. .................. 310/194 |
| 6,836,204 | B2 |   | 12/2004 | Reid et al. |
| 6,870,292 | B2 | * | 3/2005  | Owada et al. ................ 310/194 |
| 6,984,911 | B2 | * | 1/2006  | Horie et al. .................. 310/194 |
| 6,992,417 | B1 | * | 1/2006  | Yamada ........................ 310/194 |
| 7,211,918 | B2 | * | 5/2007  | Migita et al. ................. 310/215 |
| 7,262,540 | B2 | * | 8/2007  | Lee ......................... 310/216.004 |
| 8,242,656 | B1 | * | 8/2012  | Lin ............................... 310/194 |
| 8,450,898 | B2 | * | 5/2013  | Sears et al. .................. 310/194 |
| 2004/0245882 | A1 |  | 12/2004 | Horie et al. |
| 2006/0012261 | A1 |  | 1/2006  | Ku et al. |

FOREIGN PATENT DOCUMENTS

TW 525869 Y 3/2003

* cited by examiner

Primary Examiner — Tran Nguyen
(74) Attorney, Agent, or Firm — Alan Kamrath; Kamrath IP Lawfirm, P.A.

(57) ABSTRACT

An insulation bobbin unit of a stator includes first and second insulation bobbins. The first insulation bobbin has a first body and a plurality of first extension members. The first body has a first assembly hole. Each extension member has a first wound portion having a first top plate and one first side wall. The first top plate has a smaller thickness than that of the first side wall. The second insulation bobbin has a second body and a plurality of second extension members. Each second extension member includes a second wound portion having a second top plate and one second side wall. The first side wall is aligned with one edge of the second top plate that is not mounted with the second side wall, and the second side wall is aligned with one edge of the first top plate that is not mounted with the first side wall.

6 Claims, 7 Drawing Sheets

INSULATION BOBBIN OF A STATOR

This is a divisional application of U.S. patent application Ser. No. 12/944,055 filed on Nov. 11, 2010.

BACKGROUND OF THE INVENTION

1. Field of the Invention

The present invention generally relates to an insulation bobbin of a stator and, more particularly, to an insulation bobbin of a stator that provides a larger room for radial windings.

2. Description of the Related Art

Referring to FIG. 1, Taiwanese Patent No. 525869 discloses a conventional insulation bobbin 9 of a stator of a DC motor. The insulation bobbin 9 includes a body 91 and a plurality of extension members 92. The body 91 includes a hole 911 from which the extension members 92 extend outwards radially. Each extension member 92 has an accommodation room 921 whose cross section resembles a "☐" shape. The accommodation room 921 has an opening and two protruding clamp 922 located on two edges of the opening.

When the insulation bobbin 9 is coupled with a silicon steel plate unit 8, the accommodation rooms 921 may accommodate a plurality of salient-poles 81 of the silicon steel plate unit 8, in which a plurality of pole faces 82 of the silicon steel plate unit 8 extends outside the accommodation rooms 921. Based on this, each protruding clamp 922 may have a top face abutting against a bottom face of an individual salient-pole 81 so that a bottom face of the protruding clamp 922 is spaced from the bottom face of the salient-poles 81 by a distance. With the distance, a metallic coil C can be kept away from the salient-poles 81 during the winding process.

In general, when the extension members 92 are wound with more turns of the metallic coil C, the DC motor will have stronger magnetic fields and larger rotation torque. In order to improve the structural strength of the insulation bobbin 9, the portion of the extension member 92 around which the metallic coil C is wound usually has the same thickness T. As a result, less turns of the metallic coil C can be wound around the extension members 92 in an axial direction of the DC motor. In light of this problem, the thickness of the extension member 92 may be reduced to increase the number of turns of the metallic coil C. However, this reduces the structural strength of the extension members 92, causing the extension members 92 to be easily damaged during assembling and winding processes.

Therefore, it is desired to improve the conventional insulation bobbin 9.

SUMMARY OF THE INVENTION

It is therefore the primary objective of this invention to overcome the above conventional insulation bobbin by providing an insulation bobbin of a stator that has a larger room for radial windings.

In a preferred embodiment of the invention, an insulation bobbin unit of a stator includes first and second insulation bobbins. The first insulation bobbin has a first body and a plurality of first extension members coupled with the first body. The first body has a first assembly hole. Each of the extension members has a first wound portion. The first wound portion has a first top plate and one first side wall located on one side of the first top plate. A thickness of the first top plate is smaller than that of the first side wall. The second insulation bobbin has a second body and a plurality of second extension members. The second body is coupled with the first body and has a second assembly hole aligning and communicating with the first assembly hole. The second extension members are coupled with the second body and aligned with the first extension members. Each of the second extension members has a second wound portion. The second wound portion has a second top plate and one second side wall located on one side of the second top plate. A room is defined by the first top plate, the first side wall, the second top plate and the second side wall. The first side wall is aligned with one edge of the second top plate that is not mounted with the second side wall, and the second side wall is aligned with one edge of the first top plate that is not mounted with the first side wall.

In a preferred form shown, a thickness of the second top plate is smaller than that of the at least one second side wall.

In the preferred form shown, the first wound portion has the other first side wall and the second wound portion has the other second side wall. The two first side walls are located on two sides of the first top plate and the two second side walls are located on two sides of the second top plate. The two second side walls are aligned with the two first side walls.

In the preferred form shown, each of the first extension members includes one first stop wall and a first standing wall. The first stop wall and the first standing wall are formed on one end of the first top plate that is not connected to the first body. The first stop wall is located under the first top plate, the first standing wall is located above the first top plate, and the first stop wall is connected to the first side wall.

In the preferred form shown, each of the second extension members includes one second stop wall and a second standing wall. The second stop wall and the second standing wall are formed on one end of the second top plate that is not connected to the second body. The second stop wall is located under the second top plate, the second standing wall is located above the second top plate, and the second stop wall is connected to the second side wall.

In the preferred form shown, the first wound portion has the other first side wall located on the other side of the first top plate, and the second wound portion has the other second side wall located on the other side of the second top plate. Each of the first extension members includes the other first stop wall formed on the end of the first top plate that is not connected to the first body. The other first stop wall is located under the first top plate and is connected to the other first side wall. Each of the second extension members includes the other second stop wall formed on the end of the second top plate that is not connected to the second body, and the other second stop wall is located under the second top plate and is connected to the other second side wall.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
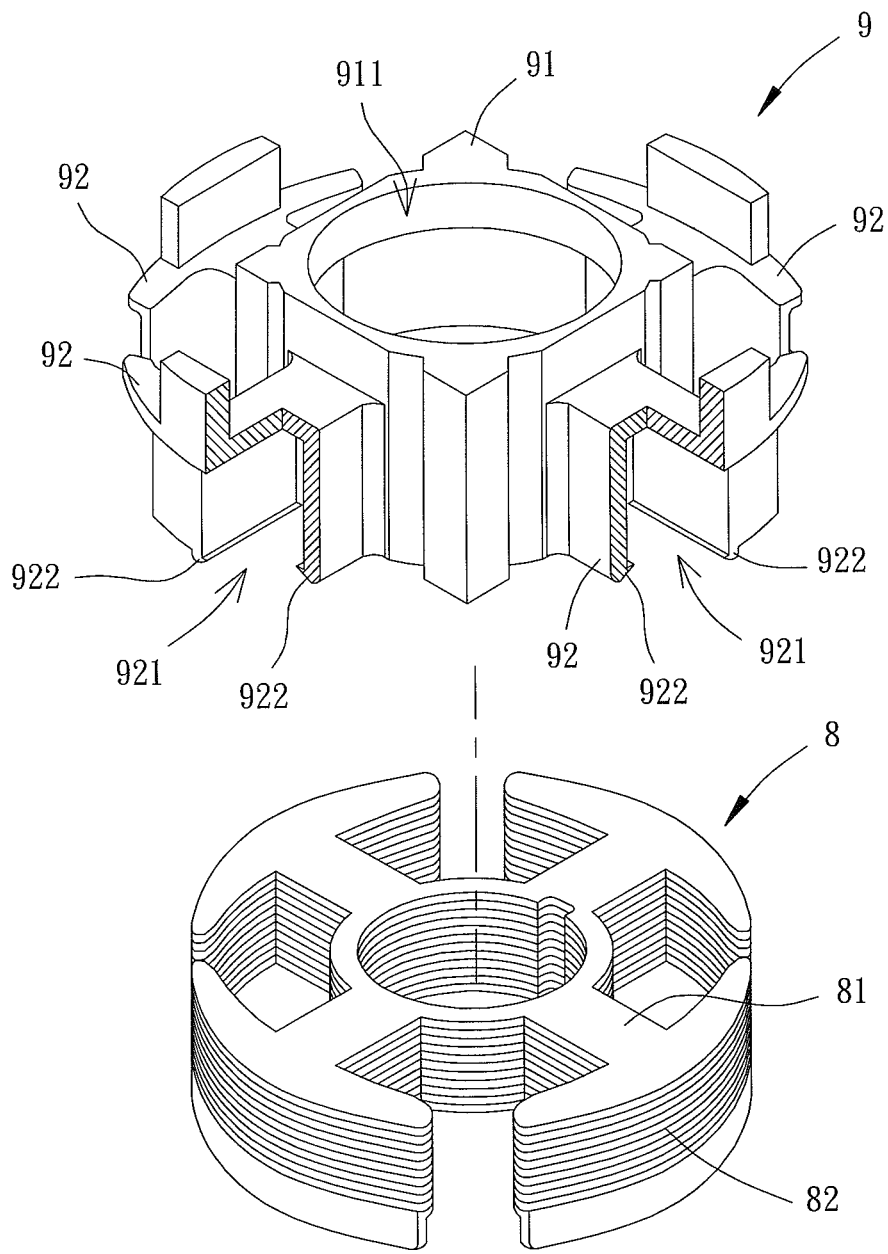
FIG. 1 shows a silicon steel plate unit and a conventional insulation bobbin.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings and are utilized only to facilitate describing the invention.

DETAILED DESCRIPTION OF THE INVENTION

Figure 3:
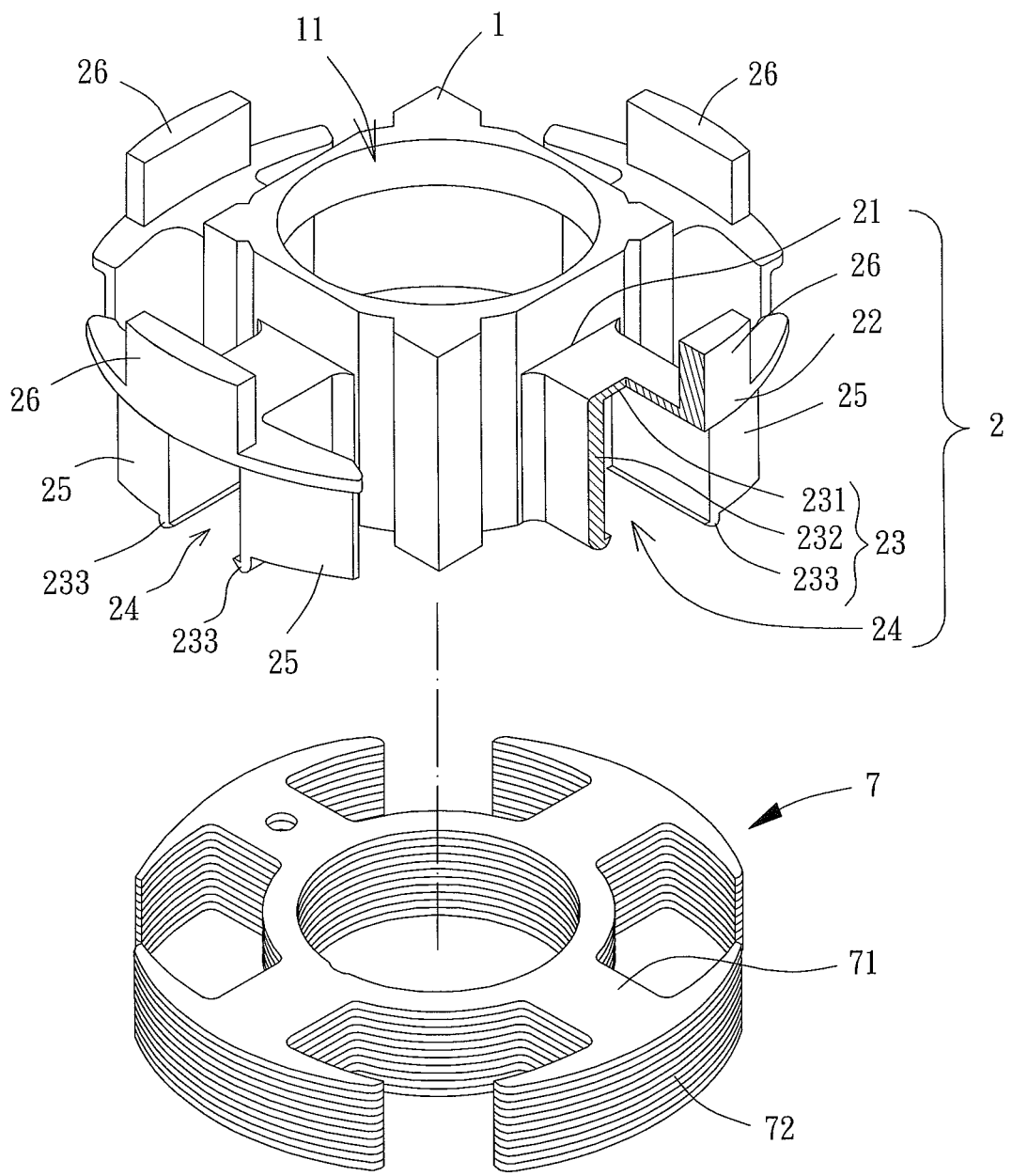
FIG. 3 shows a silicon steel plate unit and an insulation bobbin according to a first embodiment of the invention.
Figure 4:
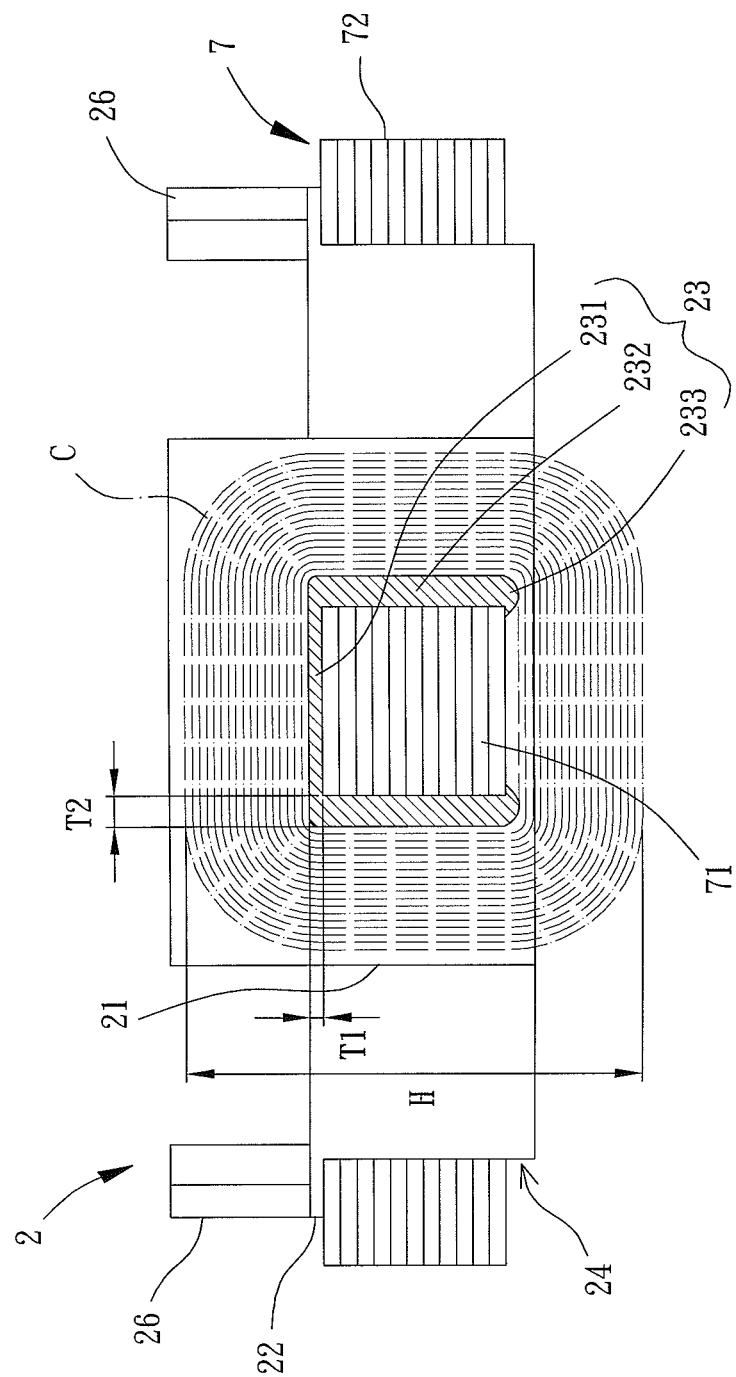
FIG. 4 shows a side cross sectional view of the silicon steel plate unit fitted into the insulation bobbin according to the first embodiment of the invention.

Referring to FIGS. 3 and 4, a single insulation bobbin of a stator of a motor is shown according to a first embodiment of the invention. The insulation bobbin includes a body 1 and a plurality of extension members 2. The extension members 2, with equal distance, may be formed on an outer wall of the body 1 in an integral manner.

The body 1 is made of insulation material such as plastic. The body 1 has an assembly hole 11 extending in an axial direction so that the insulation bobbin may be fitted through the assembly hole 11 onto an outer circumferential wall of a bearing of the motor.

Each extension member 2 has a connection end 21, a free end 22, a wound portion 23, an accommodation room 24, two stop walls 25 and a standing wall 26. The connection end 21 and the free end 22 are respectively located on two ends of the extension member 2. The connection end 21 is connected to the body 1. The free end 22 has a wider width than the connection end 21 so that the extension member 2 resembles a "T" shape from a top view. There is a gap between two adjacent free ends 22 for winding purposes. The wound portion 23 is located between the connection end 21 and the free end 22 and consists of a top plate 231 and two side walls 232. The top plate 231 extends from the connection end 21 to the free end 22. The two side walls 232 extend downwards from two sides of the top plate 231 so that the cross section of the extension member 2 resembles a "⊓" shape. Each side wall 232 has an engaging hook 233 on one end not connecting to the top plate 231. In particular, referring to FIG. 4, a distance between outer and inner faces of the top plate 231 is the thickness T1 of the top plate 231, whereas a distance between outer and inner faces of the side wall 232 is the thickness T2 of the side wall 232. The thickness T1 of the top plate 231 is smaller than the thickness T2 of the side wall 232.

Referring to FIG. 3 again, the accommodation room 24 is surrounded by the top plate 231 and the two side walls 232. The two stop walls 25 are located under the free end 22 and the standing wall 26 is located above the free end 22. The two stop walls 25 are connected to the two side walls 232.

Referring to FIGS. 3 and 4 again, during usage of the insulation bobbin, a plurality of salient-poles 71 of a silicon steel plate unit 7 is received in the accommodation rooms 24 of the extension members 2, in which each engaging hook 233 abuts against a bottom face of an individual salient-pole 71 to support and position the silicon steel plate unit 7. In addition, the silicon steel plate unit 7 further includes a plurality of pole faces 72 extending outside the stop walls 25. Based on this, the wound portion 23 of each extension member 2 is wound with a metallic coil C. The metallic coil C may be fixed to and positioned at the extension member 2 through the two stop walls 25 and the standing wall 26. The wound portion 23 is wound with the metallic coil C until a predetermined axial winding height H is reached, thus accomplishing the winding process of the motor.

Figure 2:
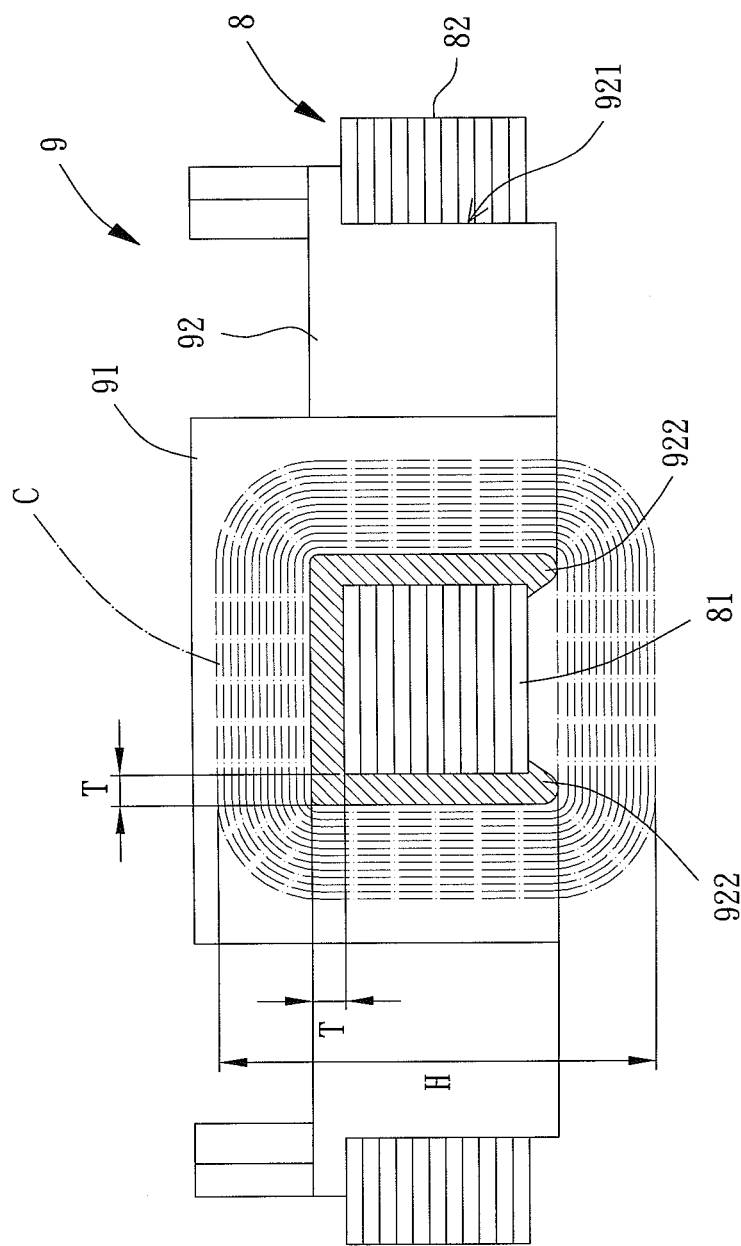
FIG. 2 shows a side cross sectional view of the silicon steel plate unit fitted into the conventional insulation bobbin.

Referring to FIGS. 2 and 4, the insulation bobbin of the first embodiment of the invention is characterized by that the wound portion 23, based on the same predetermined axial winding height H as the extension member 92 of the conventional insulation bobbin 9, may be wound with more turns of the metallic coil C in the axial direction by having the thickness T1 of the top plate 231 smaller than the thickness T2 of the side wall 232. In addition, the structural strength of the extension member 2 may still be maintained by having the thickness T2 of the side wall 232 larger than the thickness T1 of the top plate 231. Thus, the insulation bobbin of the invention may provide a larger room for radial windings. In addition, when the insulation bobbin is applied to a motor, the motor may have stronger magnetic fields to produce stronger rotation torque for the motor.

Figure 5:
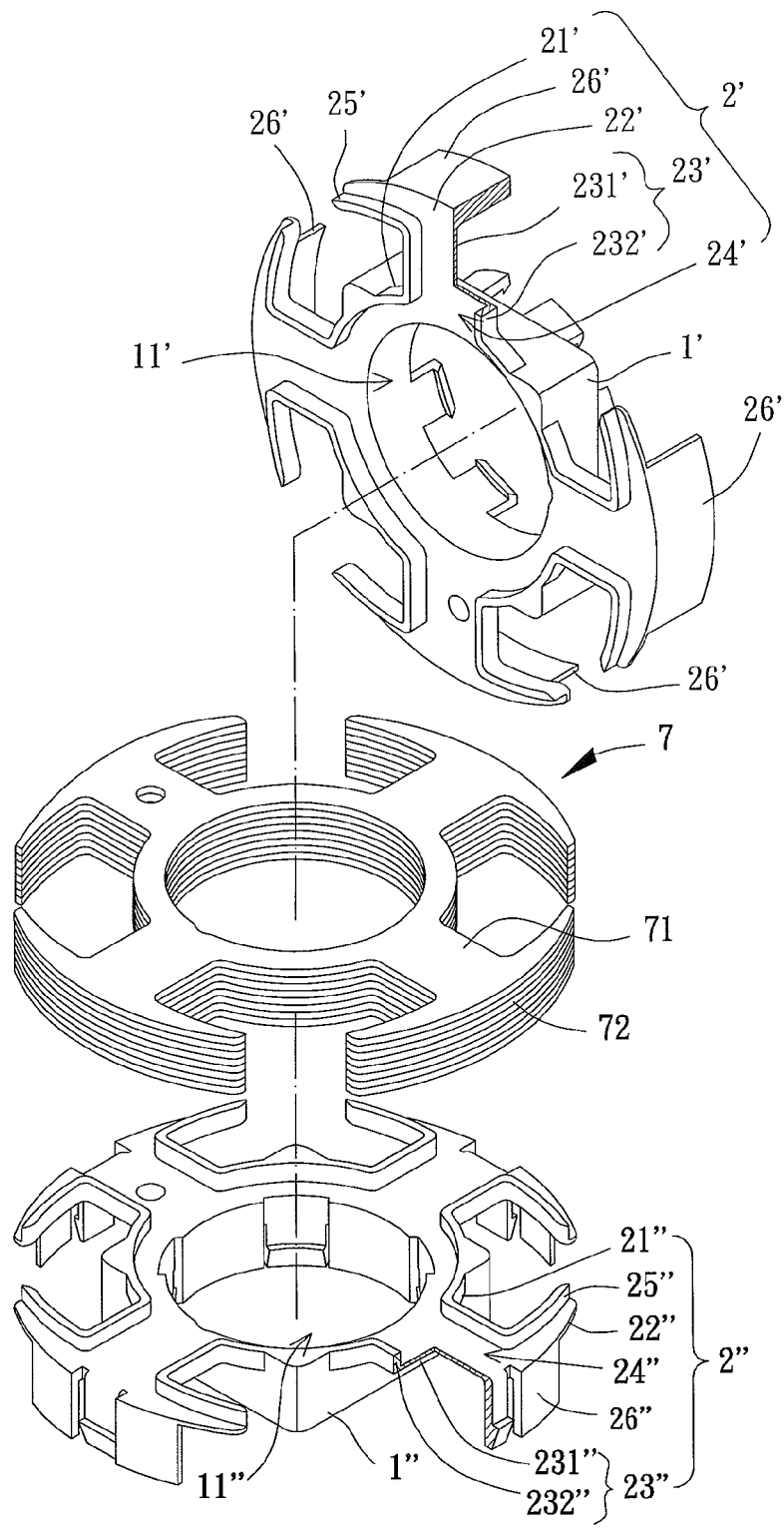
FIG. 5 shows a silicon steel plate unit and two insulation bobbins according to a second embodiment of the invention.
Figure 6:
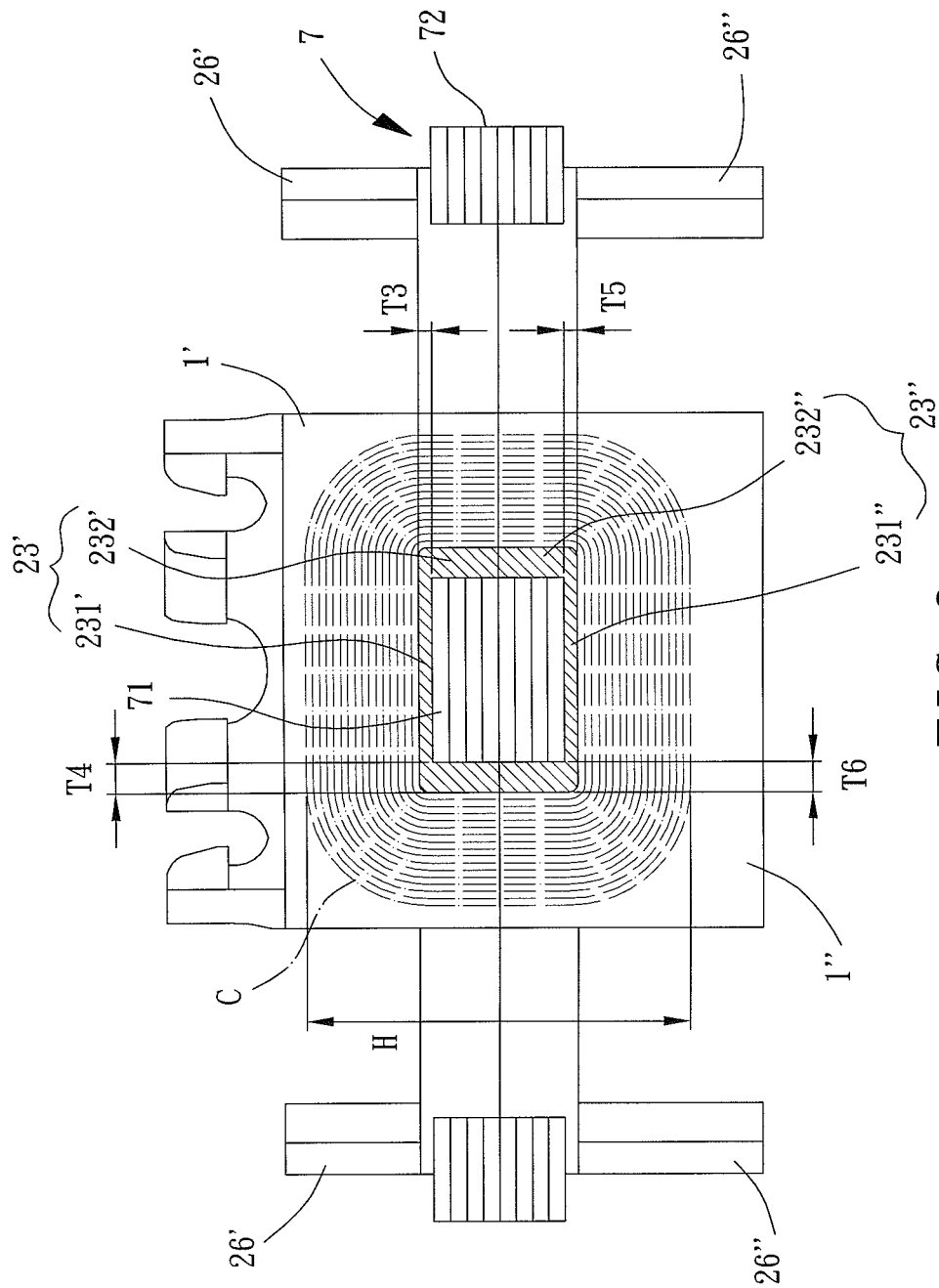
FIG. 6 shows a side cross sectional view of the silicon steel plate unit sandwiched between the two insulation bobbins according to the second embodiment of the invention.

Referring to FIGS. 5 and 6, an insulation bobbin unit of a stator is disclosed according to a second embodiment of the invention. In comparison with the first embodiment, the insulation bobbin unit of the second embodiment consists of a first insulation bobbin and a second insulation bobbin. The first and second insulation bobbins are substantially similar to that of the first embodiment. That is, the body 1, assembly hole 11, extension members 2, connection end 21, free end 22, wound portion 23, top plate 231, side walls 232, accommodation room 24, stop walls 25 and standing wall 26 of the insulation bobbin of the first embodiment correspond to a first body 1', a first assembly hole 11', a plurality of first extension members 2', a first connection end 21', a first free end 22', a first wound portion 23', a first top plate 231', two first side walls 232', a first accommodation room 24', two first stop walls 25' and a first standing wall 26' of the first insulation bobbin of the second embodiment, as well as a second body 1", a second assembly hole 11", a plurality of second extension members 2", a second connection end 21", a second free end 22", a second wound portion 23", a second top plate 231", two second side walls 232", a second accommodation room 24", two second stop walls 25" and a second standing wall 26" of the second insulation bobbin of the second embodiment. The details of the first and second insulation bobbins are not described herein again for brevity.

In the second embodiment, the first body 1' may be aligned and coupled with the second body 1" to allow communication between the first assembly hole 11' and the second assembly hole 11". Based on this, the first and second insulation bobbins may be fitted onto a circumferential wall of a bearing of the motor through the first assembly hole 11' and the second assembly hole 11". In addition, the first extension members 2' may be aligned and coupled with the second extension members 2" to allow communication between the first accommodation room 24' and the second accommodation room 24", in which bottom faces of the two first stop walls 25' abut against top faces of the two second stop walls 25".

Particularly, referring to FIG. 6, taking the first wound portion 23' and the second wound portion 23" as an example, a thickness T3 of the first top plate 231' may be smaller than a thickness T4 of the first side wall 232', or a thickness T5 of the second top plate 231" may be smaller than a thickness T6 of the second side wall 232". In this embodiment, both the thicknesses T3 and T5 of the first top plate 231' and the second top plate 231" are respectively smaller than the thicknesses T4 and T6 of the first side wall 232' and the second side wall 232", with the thickness T4 of the first side wall 232' being equal to the thickness T6 of the second side wall 232".

Referring to FIGS. 5 and 6, during usage of the first and second insulation bobbins, the silicon steel plate unit 7 is sandwiched between the first and second insulation bobbins, allowing the salient-poles 71 to be received in a space formed by the first accommodation room 24' and the second accommodation room 24", as well as allowing the pole faces 72 to extend outside the two first stop walls 25' and the two second stop walls 25". Finally, the first wound portion 23' and the second wound portion 23" are respectively wound with the metallic coil C to complete the winding processes.

The second embodiment of the invention differs from the first embodiment in that the silicon steel plate unit 7 in the second embodiment, before being wound with the metallic coil C, is sandwiched between two insulation bobbins (the first and second insulation bobbins) rather than only a single insulation bobbin as disclosed in the first embodiment. Based on this, with the same axial winding height H of the first wound portion 23' and the second wound portion 23", the thicknesses T3 and T5 of the first top plate 231' and the second top plate 231" are made smaller than the thicknesses T4 and T6 of the first side wall 232' and the second side wall 232", so that the first wound portion 23' and the second wound portion 23" may be wound with more turns of the metallic coil C in the axial direction. Therefore, stronger magnetic fields may be generated. Furthermore, the first and second insulation bobbins of the embodiment may further prevent electrical connection between the metallic coil C and the silicon steel plate unit 7 for better insulation effect.

Figure 7:
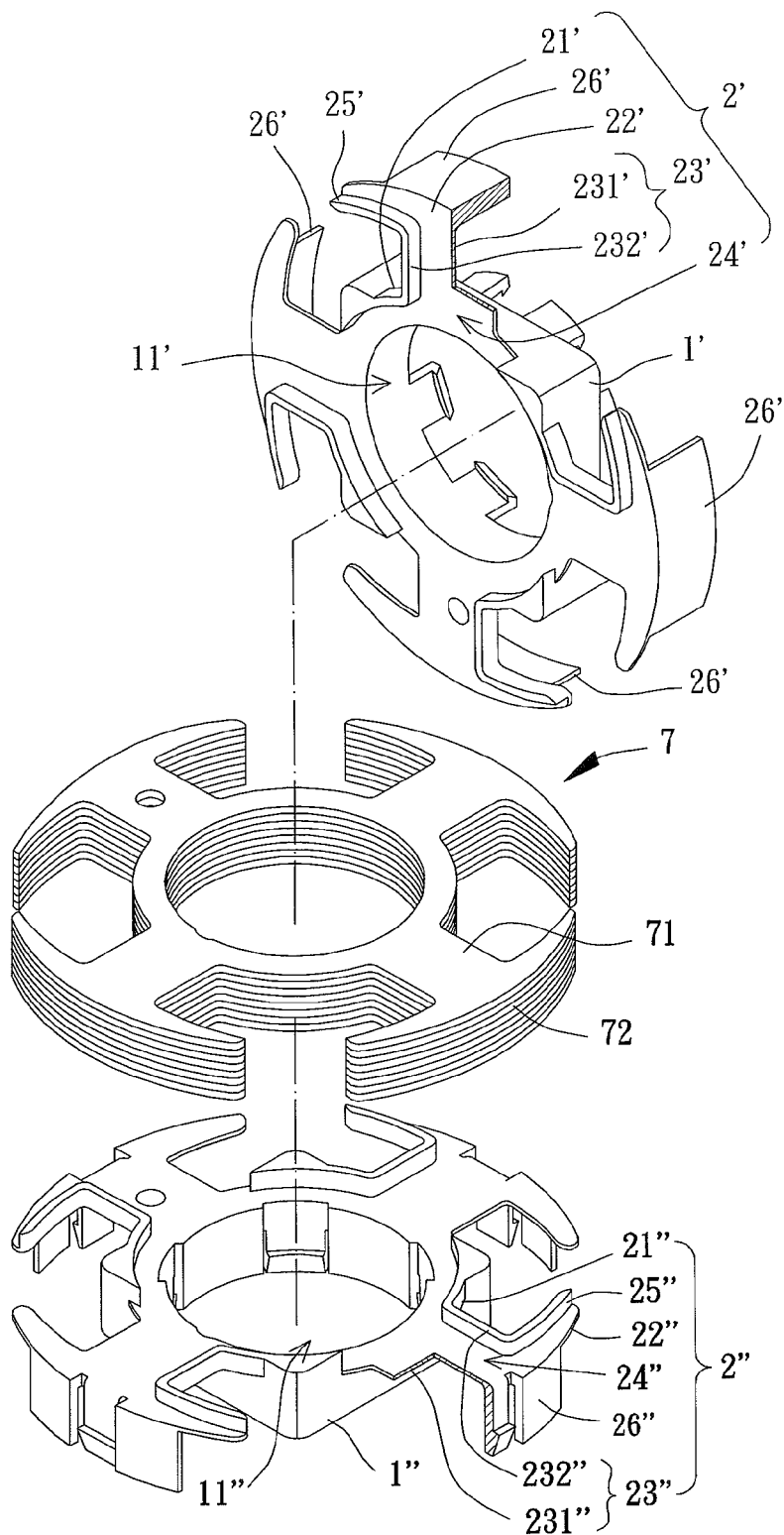
FIG. 7 shows a silicon steel plate unit and two insulation bobbins according to a third embodiment of the invention.

Referring to FIG. 7, two insulation bobbins are disclosed according to a third embodiment of the invention. In comparison with the second embodiment, the first wound portion 23' consists of a first top plate 231' and a first side wall 232', and the second wound portion 23" consists of a second top plate 231" and a second side wall 232". Based on this, the first extension members 2' and the second extension members 2" of the embodiment appear to be an "L" shape in their cross sections. Thus, when the first body 1' is aligned and coupled with the second body 1", the first side wall 232' may abut against an edge of the second top plate 231" that is not mounted with the second side wall 232". Similarly, the second side wall 232" may abut against an edge of the first top plate 231' that is not mounted with the first side wall 232'. Therefore, communication between the first accommodation room 24' and the second accommodation room 24" is allowed. Thus, the silicon steel plate unit 7 may be jointly encased by the first top plate 231', first side wall 232', second top plate 231" and the second side wall 232".

In particular, the thickness of the first top plate 231' may be smaller than that of the first side wall 232'. Alternatively, the thickness of the second top plate 231" may be smaller than that of the second side wall 232". In this embodiment, the thicknesses of the first top plate 231' and the second top plate 231" are smaller than those of the first side wall 232' and the second side wall 232", respectively.

Based on this, the first wound portion 23' and the second wound portion 23" may have more turns of winding on the axial direction, thereby providing stronger magnetic fields and better insulation effect.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. An insulation bobbin unit of a stator, comprising:
   a first insulation bobbin having a first body and a plurality of first extension members coupled with the first body, wherein the first body has a first assembly hole, each of the extension members has a first wound portion, the first wound portion has a first top plate and one first side wall located on one side of the first top plate, and a thickness of the first top plate is smaller than that of the first side wall; and
   a second insulation bobbin having a second body and a plurality of second extension members, wherein the second body is coupled with the first body and has a second assembly hole aligning and communicating with the first assembly hole, the second extension members are coupled with the second body and aligned with the first extension members, each of the second extension members has a second wound portion, the second wound portion has a second top plate and one second side wall located on one side of the second top plate, and a room is defined by the first top plate, the first side wall, the second top plate and the second side wall, wherein the first side wall is aligned with one edge of the second top plate that is not mounted with the second side wall, and the second side wall is aligned with one edge of the first top plate that is not mounted with the first side wall.

2. The insulation bobbin unit of the stator as claimed in claim 1, wherein a thickness of the second top plate is smaller than that of the at least one second side wall.

3. The insulation bobbin unit of the stator as claimed in claim 1, wherein the first wound portion has the other first side wall and the second wound portion has the other second side wall, the two first side walls are located on two sides of the first top plate and the two second side walls are located on two sides of the second top plate, and the two second side walls are aligned with the two first side walls.

4. The insulation bobbin unit of the stator as claimed in claim 1, wherein each of the first extension members includes one first stop wall and a first standing wall, the first stop wall and the first standing wall are formed on one end of the first top plate that is not connected to the first body, the first stop wall is located under the first top plate, the first standing wall is located above the first top plate, and the first stop wall is connected to the first side wall.

5. The insulation bobbin unit of the stator as claimed in claim 4, wherein each of the second extension members includes one second stop wall and a second standing wall, the second stop wall and the second standing wall are formed on one end of the second top plate that is not connected to the second body, the second stop wall is located under the second top plate, the second standing wall is located above the second top plate, and the second stop wall is connected to the second side wall.

6. The insulation bobbin unit of the stator as claimed in claim 5, wherein the first wound portion has the other first side wall located on the other side of the first top plate, and the second wound portion has the other second side wall located on the other side of the second top plate, each of the first extension members includes the other first stop wall formed on the end of the first top plate that is not connected to the first body, the other first stop wall is located under the first top plate and is connected to the other first side wall, each of the second extension members includes the other second stop wall formed on the end of the second top plate that is not connected to the second body, and the other second stop wall is located under the second top plate and is connected to the other second side wall.

* * * * *